(12) United States Patent
Oakley

(10) Patent No.: US 9,535,458 B2
(45) Date of Patent: Jan. 3, 2017

(54) ELECTRONIC DEVICE WITH RETRACTABLE LEG SUPPORT

(71) Applicant: Intel Corporation, Santa Clara, CA (US)

(72) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 14/229,842

(22) Filed: Mar. 29, 2014

(65) Prior Publication Data

US 2015/0277494 A1    Oct. 1, 2015

(51) Int. Cl.
*E05D 11/10* (2006.01)
*G06F 1/16* (2006.01)

(52) U.S. Cl.
CPC .................. *G06F 1/1633* (2013.01)

(58) Field of Classification Search
CPC ........ F16M 13/00; G06F 1/1616; G06F 1/166; G06F 1/181; G06F 1/1656
See application file for complete search history.

(56) References Cited

U.S. PATENT DOCUMENTS

| | | | | |
|---|---|---|---|---|
| 6,031,714 A * | 2/2000 | Ma | ........................ | G06F 1/1601 248/918 |
| 6,191,940 B1 * | 2/2001 | Ma | ........................ | F16M 11/00 248/917 |
| D438,777 S | 3/2001 | Alecci | | |
| 7,391,606 B2 * | 6/2008 | Chen | ...................... | F16M 11/00 248/917 |
| 7,478,788 B2 * | 1/2009 | Hsu | ........................ | F16M 11/00 248/371 |
| D596,186 S | 7/2009 | Sempliner et al. | | |
| D598,919 S | 8/2009 | Takemasa et al. | | |
| D618,244 S | 6/2010 | Sweet et al. | | |
| 7,841,575 B1 * | 11/2010 | Sliger | .................... | F16M 11/10 248/454 |
| 8,096,517 B1 * | 1/2012 | Hamilton | ............... | B60N 3/005 211/106.01 |
| 8,146,869 B2 * | 4/2012 | Wang | ...................... | F16M 11/00 248/122.1 |
| D686,623 S | 7/2013 | Bennett, Jr. et al. | | |

(Continued)

OTHER PUBLICATIONS

USPTO Aug. 7, 2015 Notice of Allowance in U.S. Appl. No. 29/503,768, 6 pages.

*Primary Examiner* — Xanthia C Cunningham
(74) *Attorney, Agent, or Firm* — Patent Capital Group

(57) ABSTRACT

Particular embodiments described herein provide for an electronic device, such as a notebook computer, laptop, or tablet that includes a circuit board coupled to a plurality of electronic components (which may include any type of components, elements, circuitry, etc.). One particular example implementation of an electronic device may include a housing, a first leg portion having a first hinge portion coupled to the housing, a second leg portion having a second hinge portion coupled to the housing, and a gear mechanism configured to couple the first hinge portion to the second hinge portion. Rotation of the first hinge portion about a first axis to move the first leg portion in a first arc causes a corresponding rotation of the second hinge portion about a second axis to move the second leg portion in a second arc.

27 Claims, 13 Drawing Sheets

(56) References Cited

U.S. PATENT DOCUMENTS

| | | | | |
|---|---|---|---|---|
| 8,699,213 B2* | 4/2014 | Loi | ............ | F16M 11/00 248/917 |
| D709,512 S | 7/2014 | Wardlaw | | |
| 8,763,977 B2* | 7/2014 | Huang | ............ | F16M 11/10 16/326 |
| 8,800,786 B2* | 8/2014 | Parkins | ............ | A47B 43/00 211/195 |
| D716,308 S | 10/2014 | Park et al. | | |
| 8,876,070 B2* | 11/2014 | Liu | ............ | F16M 11/24 16/369 |
| 8,922,995 B2* | 12/2014 | Su | ............ | F16M 11/10 248/917 |
| 8,964,382 B2* | 2/2015 | Ashcraft | ............ | G06F 1/1656 361/679.56 |
| D729,805 S | 5/2015 | Bataillou et al. | | |
| D734,301 S | 7/2015 | Inada | | |
| D746,821 S | 1/2016 | Oakley | | |
| 2002/0138947 A1* | 10/2002 | Jantschek | ............ | E04B 2/7431 16/371 |
| 2005/0127253 A1* | 6/2005 | Kim | ............ | B60R 11/0235 248/176.1 |
| 2007/0047188 A1* | 3/2007 | Kim | ............ | F16M 11/00 361/679.22 |
| 2007/0159784 A1* | 7/2007 | Chen | ............ | G06F 1/1616 361/679.27 |
| 2008/0192424 A1* | 8/2008 | Lee | ............ | F16M 11/10 361/679.03 |
| 2008/0265109 A1* | 10/2008 | Derry | ............ | F16M 11/10 248/149 |
| 2009/0278000 A1* | 11/2009 | Hu | ............ | F16M 11/10 248/122.1 |
| 2010/0012810 A1* | 1/2010 | Hu | ............ | F16M 11/10 248/408 |
| 2010/0128458 A1* | 5/2010 | Nagami | ............ | B60R 11/0235 361/825 |

* cited by examiner

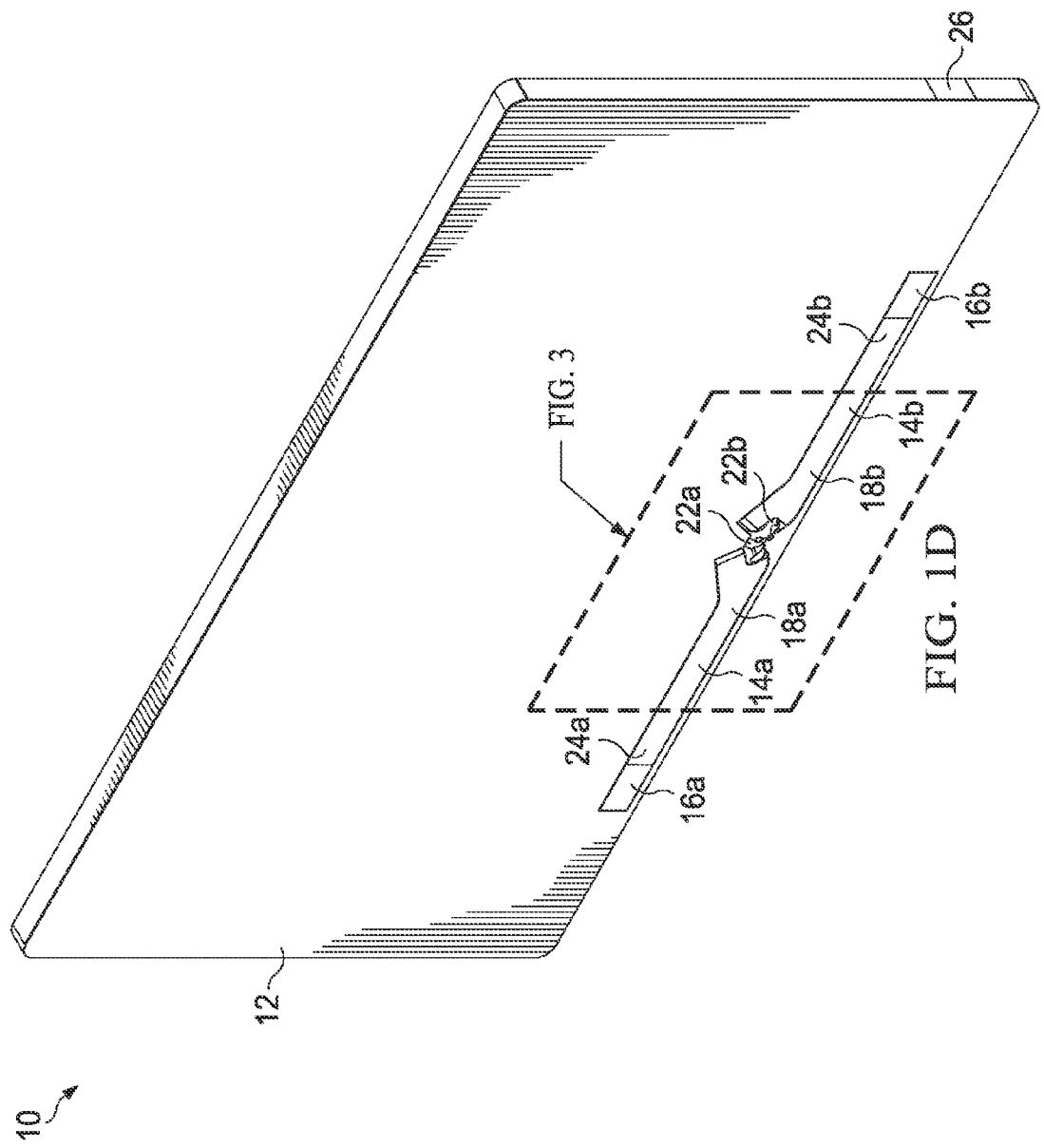

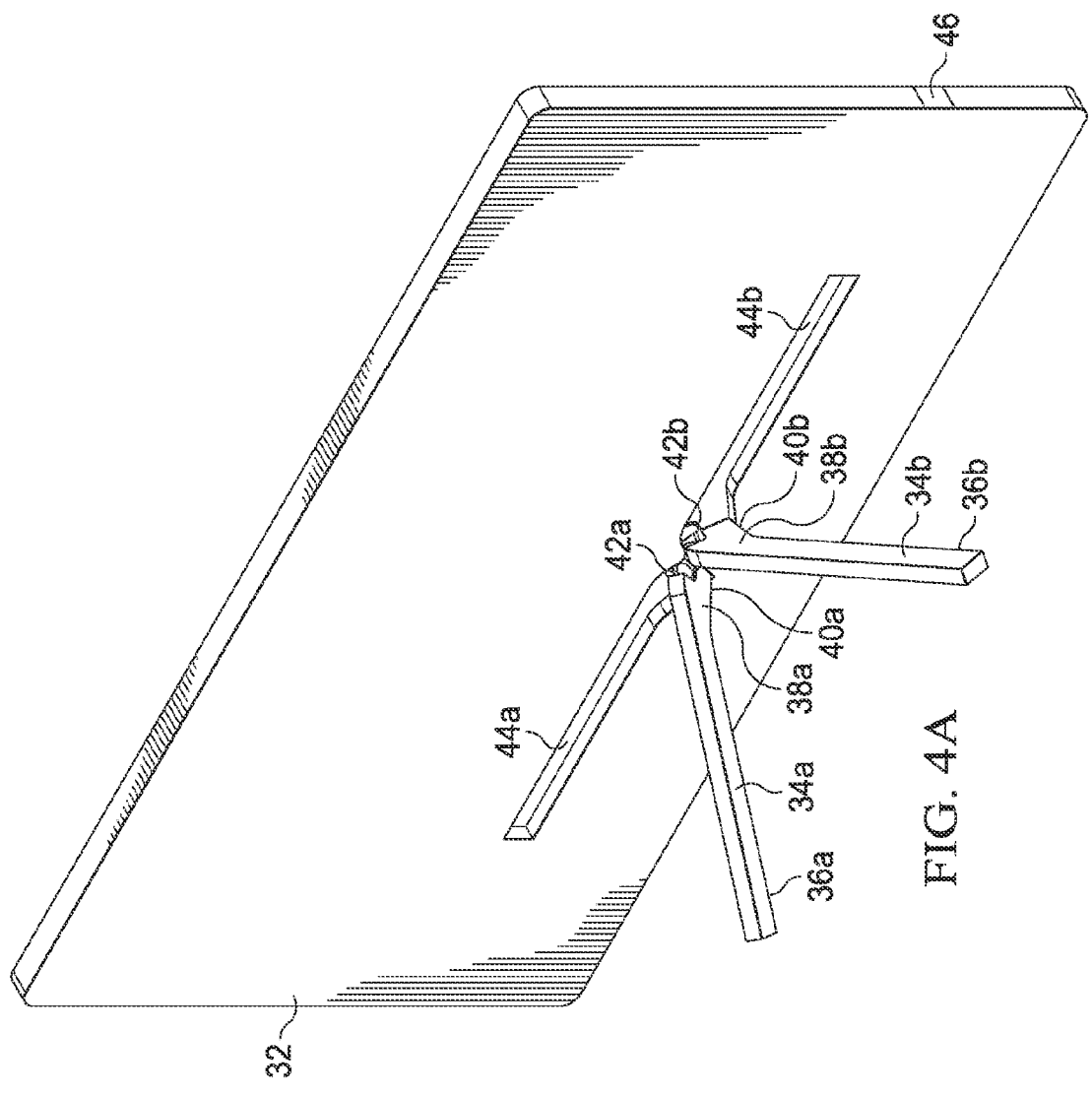

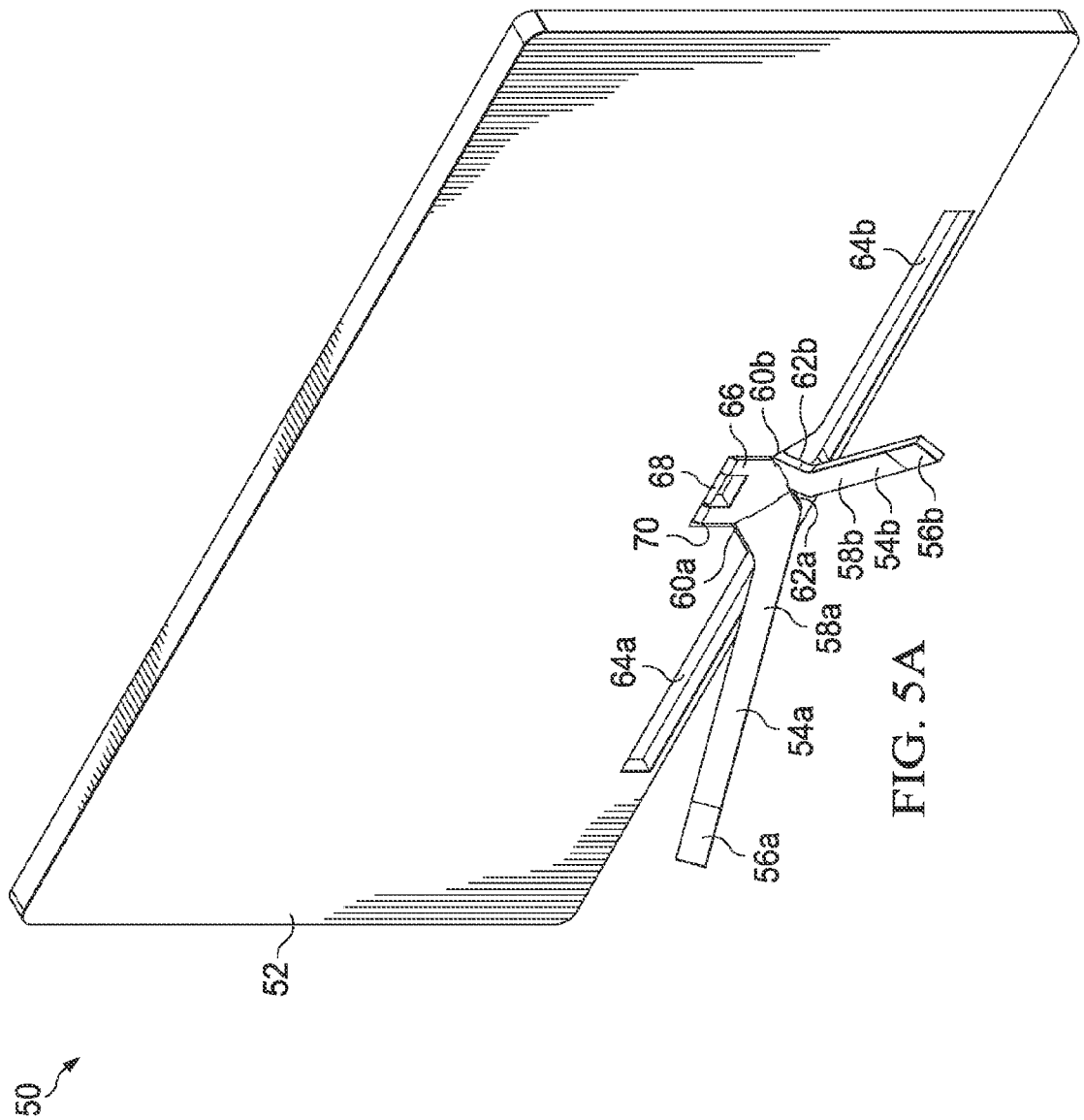

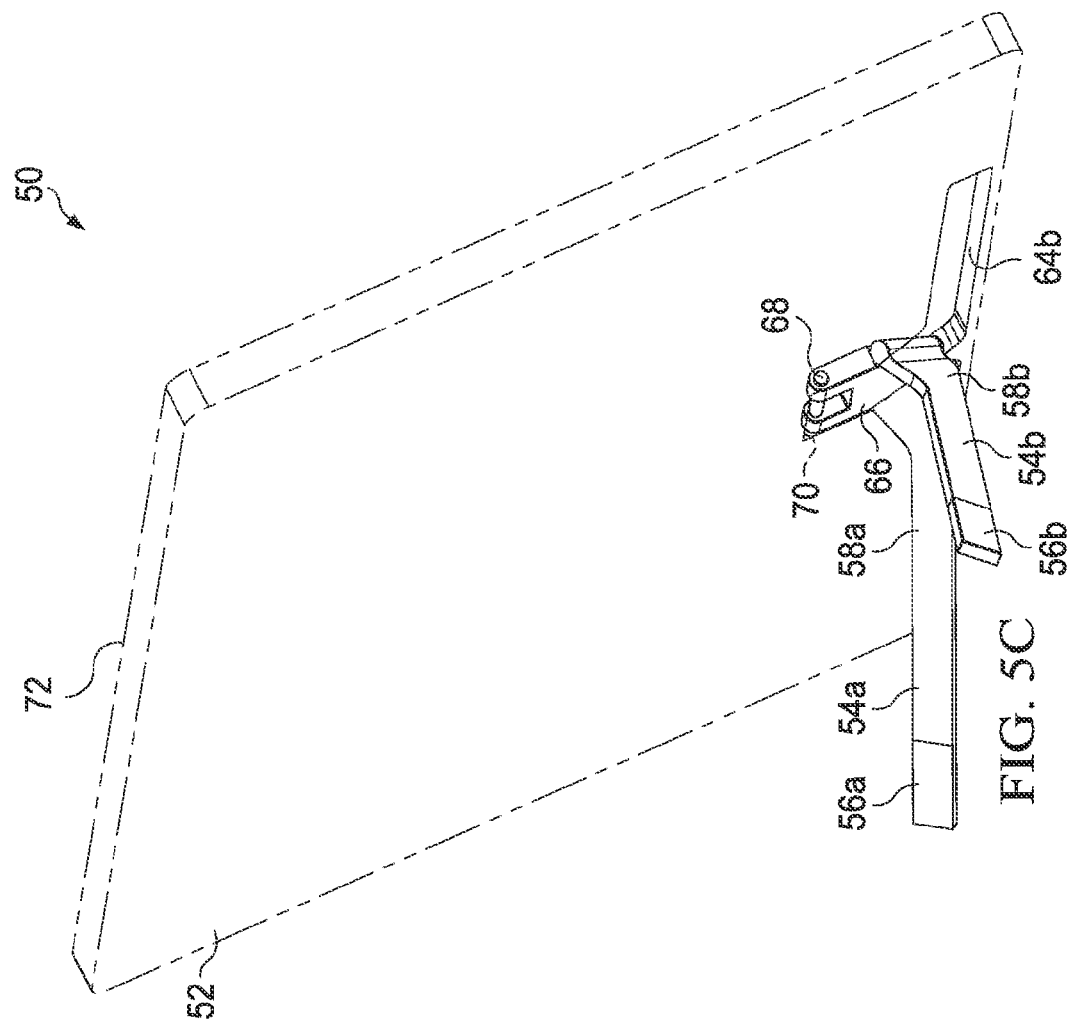
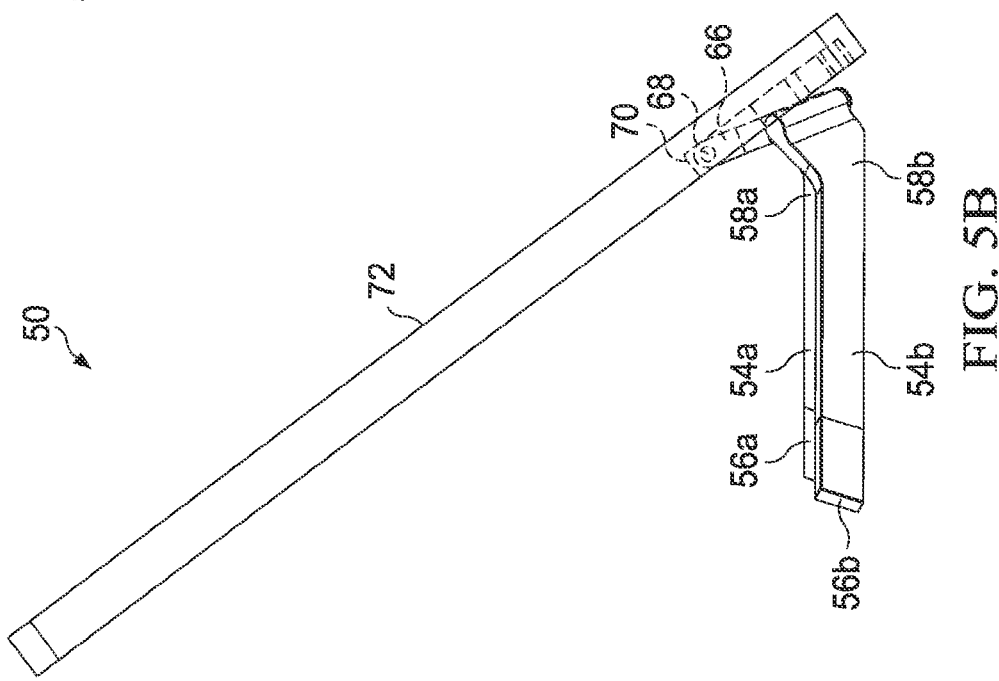

ELECTRONIC DEVICE WITH RETRACTABLE LEG SUPPORT

TECHNICAL FIELD

Embodiments described herein generally relate to an electronic device with a retractable leg support.

BACKGROUND

End users have more electronic device choices than ever before. A number of prominent technological trends are currently afoot, and these trends are changing the electronic device landscape. One of the technological trends is an electronic device which may be used in a handheld configuration in which a user holds the electronic device in the user's hands, and a "desktop" configuration in which the user places the electronic device upon a stand upon a surface. Often a user must utilize a third-party accessory in order to support the electronic device in a desktop configuration. It may be desirable to integrate the support stand with the electronic device. However, current solutions tend to be complex, heavy, and add significant manufacturing cost to the electronic device. In addition, current solutions often have a negative impact upon the industrial design considerations of the electronic device. Existing designs are often plagued by fussy mechanical behaviors of the support during use by the user. Hence, there is a challenge in providing an integrated support for electronic devices which allow the electronic device to be changed from a handheld mode of operation to a desktop mode of operation.

BRIEF DESCRIPTION OF THE DRAWINGS

Embodiments are illustrated by way of example and not by way of limitation in the FIGURES of the accompanying drawings, in which like references indicate similar elements and in which:

FIG. 1D is a simplified rear perspective view illustrating an embodiment of the electronic device having a retractable leg support in a closed configuration in accordance with one embodiment of the present disclosure;

FIG. 4A is a simplified rear perspective view illustrating an embodiment of an electronic device having a retractable leg support in an open position in accordance with one embodiment of the present disclosure;

FIG. 5A is a simplified rear perspective view illustrating an embodiment of an electronic device having a retractable leg support in an open position in accordance with one embodiment of the present disclosure;

FIG. 5B is a simplified side perspective view illustrating an embodiment of the electronic device having a retractable leg support in an open position in accordance with one embodiment of the present disclosure;

FIG. 5C is a simplified front view illustrating an embodiment of the electronic device in a partially closed configuration in accordance with one embodiment of the present disclosure;

Figure 1A:
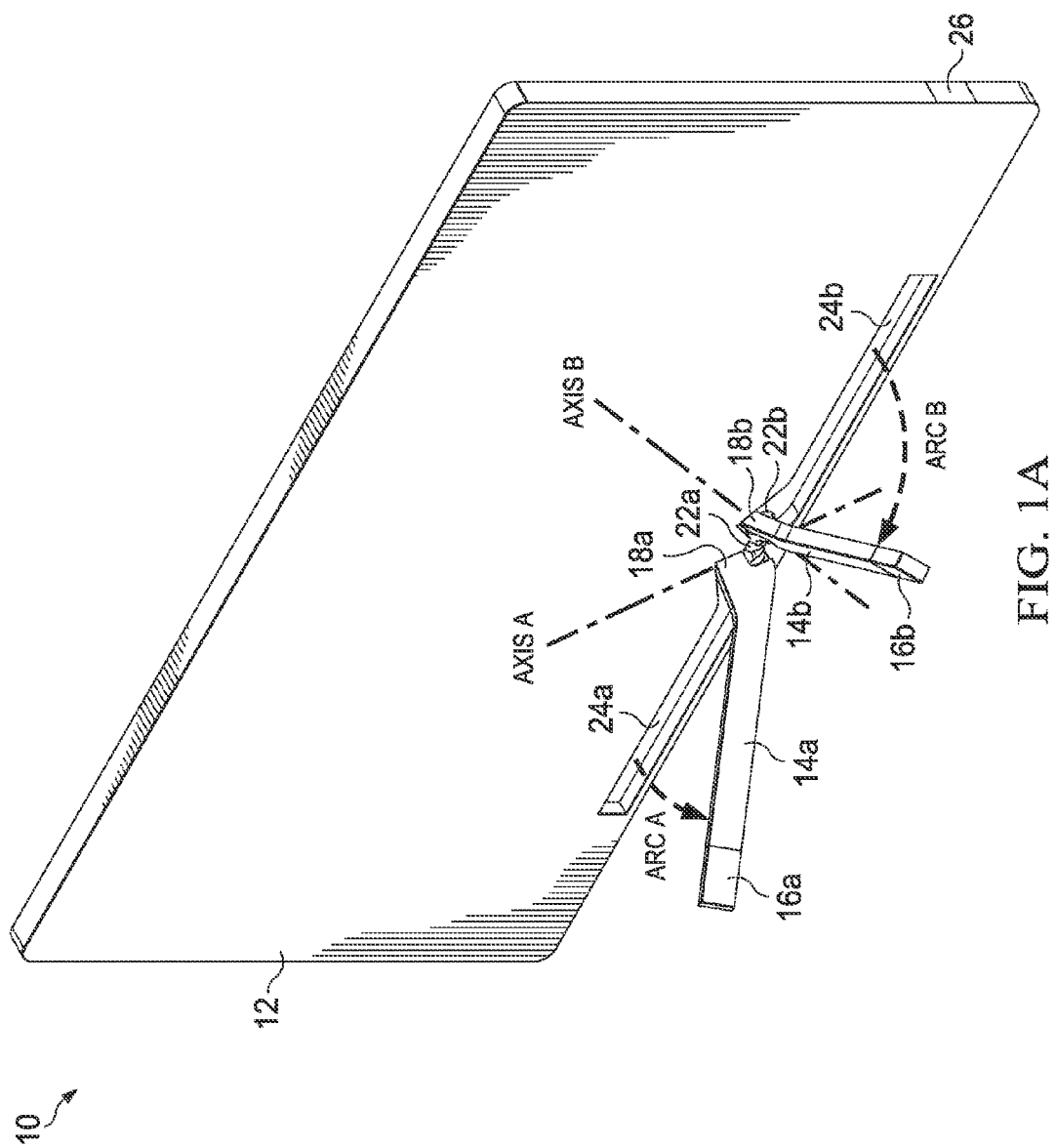
FIG. 1A is a simplified rear perspective view illustrating an embodiment of an electronic device having a retractable leg support in an open position in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for an electronic device, such as a notebook computer, laptop, or tablet that includes a circuit board coupled to a plurality of electronic components (which may include any type of components, elements, circuitry, etc.). One particular example implementation of an electronic device may include a housing, a first leg portion having a first hinge portion coupled to the housing, a second leg portion having a second hinge portion coupled to the housing, and a gear mechanism configured to couple the first hinge portion to the second hinge portion. Rotation of the first hinge portion about a first axis to move the first leg portion in a first arc causes a corresponding rotation of the second hinge portion about a second axis to move the second leg portion in a second arc.

In certain embodiments, the gear mechanism comprises a first gear fixedly coupled to the first hinge portion of the first leg portion, and a second gear fixedly coupled to the second hinge portion of the second leg portion. In certain embodiments, a pitch of the first gear is substantially the same as a pitch of the second gear. In certain other embodiments, at least one of the first gear and the second gear is a bevel gear. In certain embodiments, the electronic device further includes a first hinge pin configured to couple the first hinge portion to the housing, and a second hinge pin configured to couple the second hinge portion to the housing.

In certain embodiments, the first leg portion is disposed within a first recess of the housing when the first leg portion is in a closed configuration, and the second leg portion is disposed within a second recess of the housing when the second leg portion is in the closed configuration. In other certain embodiments, the electronic device further comprises a third hinge portion hingedly coupled to the first hinge portion of the first leg portion and the second hinge portion of the second leg portion, the third hinge portion further hingedly coupled to the housing. In certain embodiments, the third hinge portion is disposed within a third recess of the housing when the third hinge portion is in a closed configuration. In still other certain embodiments, the first arc is substantially equal to the second arc.

In certain embodiments, the electronic device further comprises a release mechanism configured to allow to a user to release the first leg portion and second leg portion from the housing. In certain other embodiments, the electronic device further comprises a foot portion at an end of the first leg portion, the foot portion configured to allow a user to extend first leg portion and second leg portion into an open configuration.

Another particular example implementation may include a housing and a retractable leg support coupled to the housing. The retractable leg support may include a first leg portion having a first hinge portion coupled to the housing, a second leg portion having a second hinge portion coupled to the housing, and a gear mechanism configured to couple the first hinge portion to the second hinge portion. Rotation of the first hinge portion about a first axis to move the first leg portion in a first arc causes a corresponding rotation of the second hinge portion about a second axis to move the second leg portion in a second arc.

Another particular example implementation may include a method including receiving an electronic device having a housing, a first leg portion having a first hinge portion coupled to the housing, a second leg portion having a second hinge portion coupled to the housing, and a gear mechanism configured to couple the first hinge portion to the second hinge portion. The method further includes rotating the first hinge portion about a first axis to move the first leg portion in a first arc thereby causing a corresponding rotation of the second hinge portion about a second axis to move the second leg portion in a second arc.

Another particular example implementation may include a system having means for receiving an electronic device having a housing, a first leg portion having a first hinge portion coupled to the housing, a second leg portion having a second hinge portion coupled to the housing, and a gear mechanism configured to couple the first hinge portion to the second hinge portion, and means for rotating the first hinge portion about a first axis to move the first leg portion in a first arc thereby causing a corresponding rotation of the second hinge portion about a second axis to move the second leg portion in a second arc.

Example Embodiments

The following detailed description sets forth example embodiments of apparatuses, methods, and systems relating to retractable leg support configurations for an electronic device. Features such as structure(s), function(s), and/or characteristic(s), for example, are described with reference to one embodiment as a matter of convenience; various embodiments may be implemented with any suitable one or more of the described features.

For purposes of illustrating certain example features of electronic devices 10, 30, and 50, the following foundational information may be viewed as a basis from which the present disclosure may be properly explained. End users have more electronic device choices than ever before. A number of prominent technological trends are currently afoot, and these trends are changing the electronic device landscape. One of the technological trends is an electronic device which may be used in a handheld configuration in which a user holds the electronic device in the user's hands, and a "desktop" configuration in which the user places the electronic device upon a stand upon a surface. Often a user must utilize a third-party accessory in order to support the electronic device in a desktop configuration. It may be desirable to integrate the support stand with the electronic device. However, current solutions tend to be complex, heavy, and add significant manufacturing cost to the electronic device. In addition, current solutions often have a negative impact upon the industrial design considerations of the electronic device. Existing designs are often plagued by fussy mechanical behaviors of the support during use by the user. Hence, there is a challenge in providing an integrated support for electronic devices which allow the electronic device to be changed from a handheld mode of operation to a desktop mode of operation. Various embodiments described herein provide for an integrated retractable leg support for an electronic device having two legs that are hinged together so that they may be deployed synchronously around independent axes in such a way that they provide a stable footprint for the electronic device at an optimal angle for reading or other interaction during a desktop configuration.

FIG. 1A is a simplified rear perspective view illustrating an embodiment of an electronic device 10 having a retractable leg support in an open position in accordance with one embodiment of the present disclosure. FIG. 1A illustrates the retractable leg support in a deployed open position to allow electronic device 10 to be placed and supported on a surface to allow a user to operate electronic device 10 in a desktop configuration. Electronic device 10 includes a housing 12 having a first leg portion 14a and a second leg portion 14b each hingedly coupled to a back portion of housing 12 and configured to be stowed along a bottom rear portion of housing 12. First leg portion 14a includes a first foot portion 16a at a first end thereof and a first hinge portion 18a at a second end thereof. Similarly, second leg portion 14b includes a second foot portion 16b at a first end thereof and a second hinge portion 18b at a second end thereof.

FIG. 1A Illustrates the canting of the individual hinge axes that allow first leg portion 14a and second leg portion 14b to rotate upwards as well as horizontally so that electronic device 10 may be positioned at a suitable angle from the vertical for desktop interaction. First hinge portion 18a of first leg portion 14a is coupled to housing 12 by a first hinge pin 20a (see FIG. 2) along a first axis of rotation "Axis A", and second hinge portion 18b of second leg portion 14b is coupled to housing 12 by second hinge pin 20b (see FIG. 2) along a second axis of rotation "Axis B". In a particular embodiment, the first axis of rotation may intersect the second axis of rotation at a point below the first hinge portion 18a and the second hinge portion 18b. In accordance with various embodiments, first leg portion 14a and second leg portion 14b are coupled together in such a manner that they may be deployed from a closed position or configuration to the open position in a substantially synchronous manner such that when a user grasps and extends either of first leg portion 14a and second leg portion 14b, first leg portion 14a and second leg portion 14b are extended at substantially the same time. In a particular embodiment, either first foot portion 16a of first leg portion 14a or second foot portion 16b of second leg portion 14b may be configured to allow the user to extend, such as by a pulling action, either of first leg portion 14a and second leg portion 14b into an open position or configuration. In the illustrated embodiments, a first gear 22a associated with first leg portion 14a and disposed on first hinge pin 20a is coupled to a second gear 22b associated with second leg portion 14b and disposed on second hinge pin 20b. In a particular embodiment, at least one of first gear 22a and second gear 22b is a bevel gear. In still other embodiments, first gear 22a and second gear 22b may be any suitable gear type.

In the illustrated embodiment, housing 12 includes a first recess 24a from which first leg portion 14a is configured to deploy, and a second recess 24b from which second leg portion 14b is configured to deploy. In the illustrated embodiment, first leg portion 14a is configured to deploy from first recess 24a in a first arc "Arc A", and second leg portion 14b is configured to deploy from second recess 24b in a second arc "Arc B". In a particular embodiment, the angle of first arc "Arc A" is substantially equal to the angle of second arc "Arc B" are substantially equal when the retractable leg support is in the deployed open position. In the illustrated embodiment, the first Axis "Axis A" and second axis "Axis B" are configured such that first leg portion 14a and second leg portion 14b swing outwardly and upwardly during deployment from first recess 24a and second recess portion 24b, respectively, such that electronic device 10 is supported in a backward titled position when first foot portion 16a of first leg portion 14a and second foot portion 16b of second leg portion 14b are placed upon a surface in the deployed open position. In the deployed open position of the retractable leg support, a bottom portion of housing 12, first foot portion 16a, and second foot portion 16b are in contact with the surface in order to support electronic device 10 in the desktop configuration.

In a particular embodiment, first leg portion 14a and/or second leg portion 14b may be coupled to a release spring (not shown) and electronic device 10 may further include a release latch mechanism 26 configured to allow to a user to release first leg portion 14a and second leg portion 14b from first recess 24a and second recess 24b from a spring release.

In one or more embodiments, electronic device 10 (and 30 and 50 discussed below) is tablet device and/or tablet device or a slim form factor personal computer. a notebook computer or laptop computer. In still other embodiments, electronic device 10 (and 30 and 50 discussed below) may be any suitable electronic device having a display such as a mobile device, Phablet™, a personal digital assistant (PDA), a smartphone, notebook computer, laptop computer, a movie player of any type, etc. In yet another embodiment, most of the electronics (e.g., processor, memory, etc.) for electronic device 10 reside in housing 12. In an embodiment, electronic device 10 may contain a camera, a microphone, and speakers.

Figure 1B:
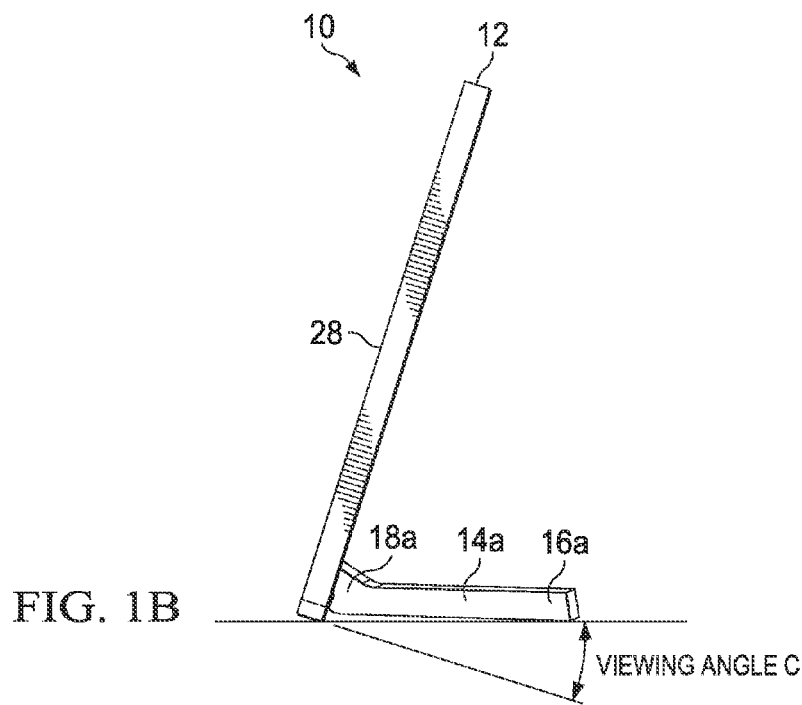
FIG. 1B is a simplified side perspective view illustrating an embodiment of the electronic device having a retractable leg support in an open position in accordance with one embodiment of the present disclosure.

FIG. 1B is a simplified side perspective view illustrating an embodiment of the electronic device 10 having a retractable leg support in an open position in accordance with one embodiment of the present disclosure. FIG. 1B illustrates the retractable leg support in a deployed open position and electronic device 10 placed and supported on a surface to provide a stable footprint to allow a user to operate electronic device 10 in the desktop configuration to display and/or interact with display screen 28 of electronic device 10. In one or more embodiments, display screen 28 can be a liquid crystal display (LCD), organic light-emitting diode (OLED), or some other type of display. In some embodiments, display screen 28 may also be a touchscreen display. In the embodiment illustrated in FIG. 1B, first leg portion 14a and second leg port 14b are configured to support electronic device 10 at a predetermined viewing angle C when first foot portion 16a, second foot portion 16b, and a bottom edge of housing 12 are in contact with the surface. In a particular embodiment, the viewing angle C is approximately fifteen (15) degrees. In still other embodiments, first leg portion 14a and second leg portion 14b may be configured to provide any desired viewing angle C.

Figure 1C:
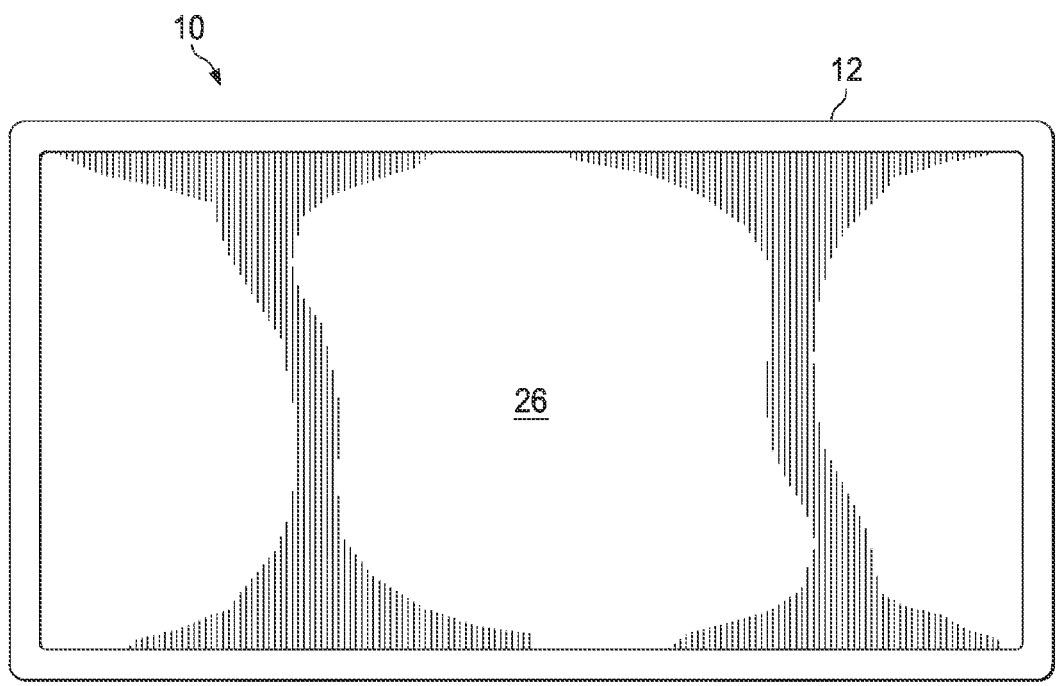
FIG. 1C is a simplified front view illustrating an embodiment of the electronic device in accordance with one embodiment of the present disclosure.

FIG. 1C is a simplified front view illustrating an embodiment of the electronic device 10 in accordance with one embodiment of the present disclosure. FIG. 1C shows the display screen 26 disposed within a front portion of housing 12 which enables a user to view content displayed by display screen 26 and/or interact with display screen 26 when first leg portion 14a and second leg portion 14b are in either the closed position or the open position.

FIG. 1D is a simplified rear perspective view illustrating an embodiment of the electronic device 10 having a retractable leg support in a closed configuration in accordance with one embodiment of the present disclosure. In the embodiment illustrated in FIG. 1D, first leg portion 14a is retracted within first recess 24a and second leg portion 14b is retracted within second recess 24b. In the particular embodiment illustrated in FIG. 1D, when electronic device 10 is in the closed configuration, first leg portion 14a and second leg portion 14b are disposed laterally along the bottom rear portion of housing 12 within first recess 24a and second recess 24b, respectively. In the closed configuration, electronic device 10 may be used in a handheld mode in which a user may grasp the electronic device 10 while in use.

Figure 2:
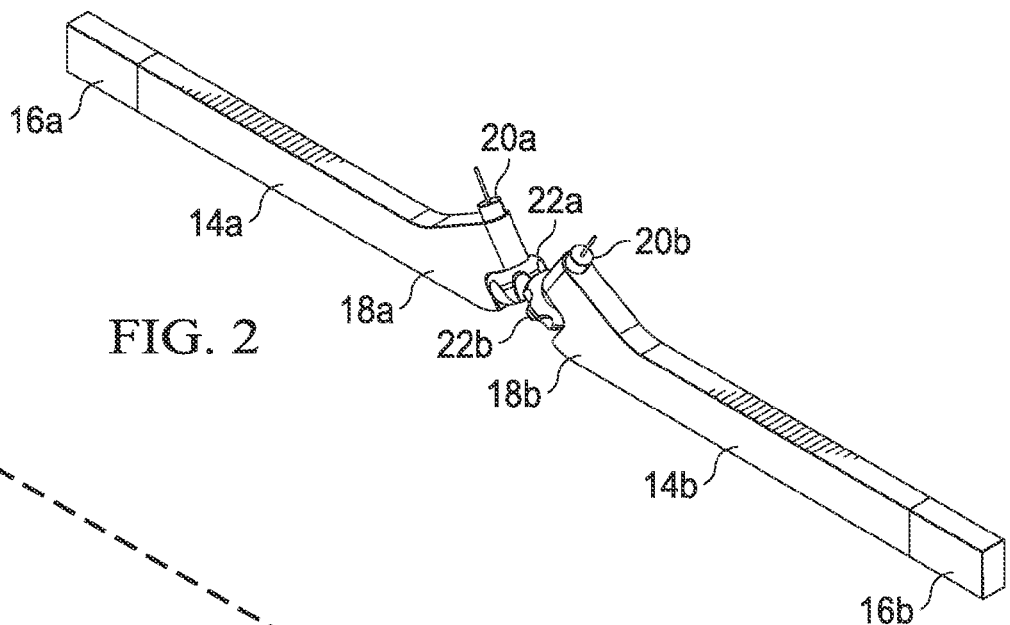
FIG. 2 is a simplified view illustrating an embodiment of the retractable leg support mechanism of the electronic device in accordance with one embodiment of the present disclosure.

FIG. 2 is a simplified view illustrating an embodiment of the retractable leg support mechanism of electronic device 10 in accordance with one embodiment of the present disclosure. For clarity, the retractable leg support mechanism illustrated in FIG. 2 is shown in isolation outside of housing 12 of electronic device 10. The retractable leg support mechanism illustrated in include first leg portion 14a including first foot portion 16a and first hinge portion 18a, second leg portion 14b including second foot portion 16b and second hinge portion 18b, first hinge pin 20a, second hinge pin 20b, first gear 22a, and second gear 22b. First leg portion 14a is coupled to first hinge pin 20a via first hinge portion 20a. First gear 22a is fixedly attached to first hinge portion 18a of first leg portion 14a and configured to rotate about first axis "Axis A" of first hinge pin 20a. Similarly, second leg portion 14b is coupled to second hinge pin 20b via second hinge portion 18b, and second gear 22b is fixedly attached to second hinge portion 18b of second leg portion 14b. Second gear 22b is further configured to rotate about second axis "Axis B" of second hinge pin 20b.

First gear 22a is further coupled to second gear 22b such that rotation of first gear 22a about first hinge pin 20a causes a corresponding rotation of second gear 22b about second hinge pin 20b. Similarly, rotation of second gear 22b about second hinge pin 20b causes a corresponding rotation of first gear 22a about first hinge pin 20a. Accordingly, when a user extends first leg portion 14a from a closed position to an open position, swinging out of first leg portion 14a causes rotation of first gear 22a about first hinge pin 20a. The rotation of first gear 22a about first hinge pin 20a causes a corresponding rotation of second gear 22b about second hinge pin 20b. Rotation of second gear 20b about second hinge pin 20b causes a corresponding extension of second leg portion 14b from the closed to the open position. Accordingly, first leg portion 14a and second leg portion 14b are extended to the open position in a substantially synchronous manner when either of first leg portion 14a and second leg portion 14b are extended by the user. Similarly, folding of either of first leg portion 14a or second leg portion 14b from the open extended position to a closed stowed position causes first leg portion 14a and second leg portion 14b to be stowed within first recess 24a and second recess 24b, respectively, in a substantially synchronous manner.

Figure 3:
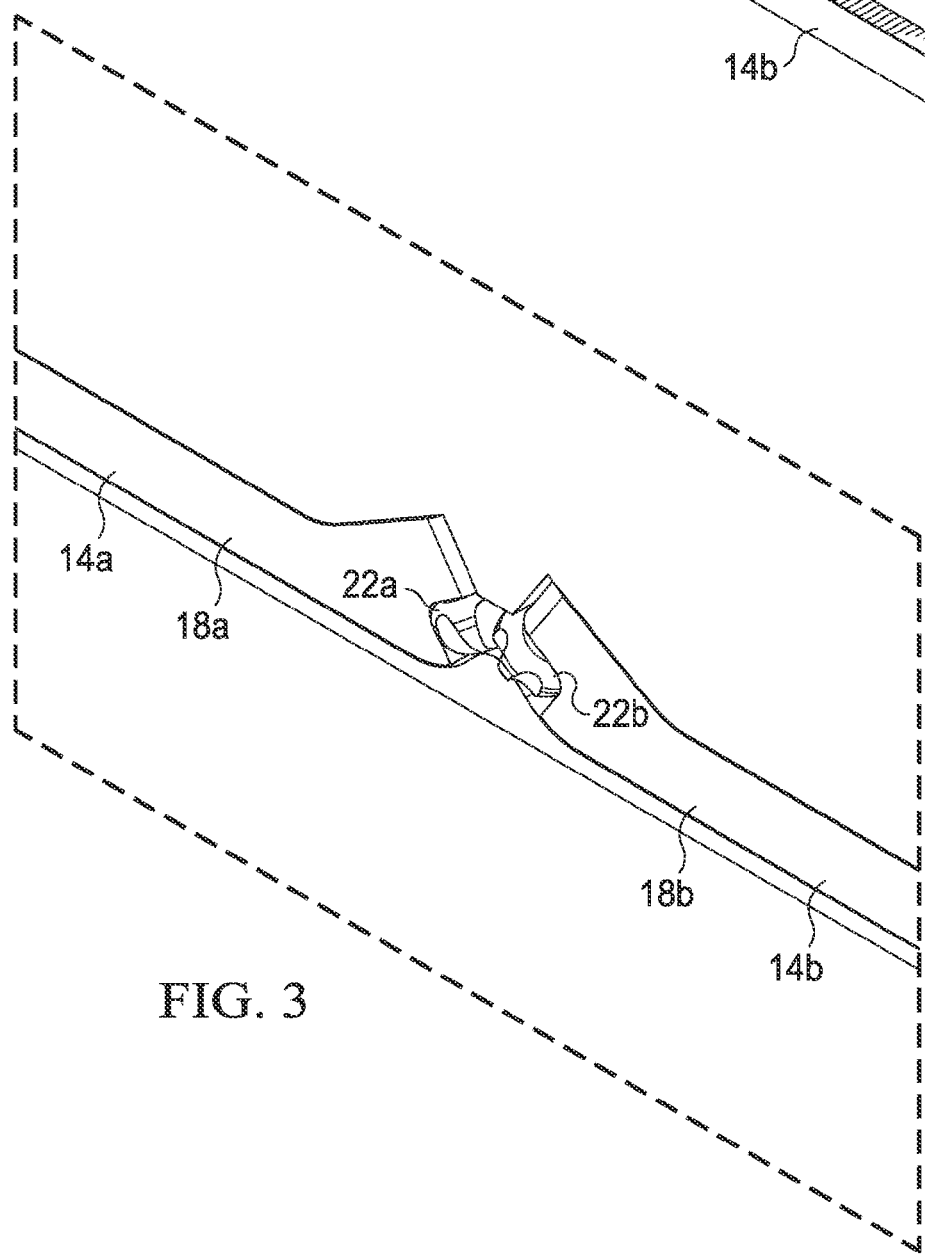
FIG. 3 is a simplified close-up view illustrating an embodiment of a portion of the retractable leg support mechanism of the electronic device in accordance with one embodiment of the present disclosure.

FIG. 3 is a simplified close-up view illustrating an embodiment of a portion of the retractable leg support mechanism of electronic device 10 in accordance with one embodiment of the present disclosure. FIG. 3 more clearly shows meshing of gear teeth of first gear 22a with gear teeth of second gear 22b. In particular embodiments, the pitch of first gear 22a is substantially the same as the pitch of second gear 22b. Although the embodiment illustrated in FIG. 3 shows the meshing of first gear 22a and second gear 22b, it should be understood that other embodiments may use a gear mechanism to couple first hinge portion 18a and second hinge portion 18b having more than two gears to form the retractable leg support mechanism.

FIG. 4A is a simplified rear perspective view illustrating an embodiment of an electronic device 30 having a retractable leg support in an open position in accordance with one embodiment of the present disclosure. In the embodiment illustrated in FIG. 4A, the retractable leg support is located further up upon the rear of the housing and flipped by one-hundred and eighty (180) degrees than the embodiment illustrated in FIGS. 1A-1D such that the legs of the support swing downward instead of upward when being transitioned from a closed configuration to an open configuration. FIG. 4A illustrates the retractable leg support in a deployed open position to allow electronic device 30 to be placed and supported on a surface to allow a user to operate electronic device 30 in a desktop configuration. Electronic device 30 includes a housing 32 having a first leg portion 34a and a second leg portion 34b each hingedly coupled to a back portion of housing 32 and configured to be stowed along a substantially a lower quarter portion of the rear of housing 32. First leg portion 34a includes a first foot portion 36a at a first end thereof and a first hinge portion 38a at a second end thereof. Similarly, second leg portion 34b includes a second foot portion 36b at a first end thereof and a second hinge portion 38b at a second end thereof.

FIG. 4A Illustrates the canting of the individual hinge axes that allow first leg portion 34a and second leg portion 34b to rotate downwards as well as horizontally so that electronic device 30 may be positioned at a suitable angle from the vertical for desktop interaction. First hinge portion 38a of first leg portion 34a is coupled to housing 32 by a first hinge pin 40a along a first axis of rotation, and second hinge portion 38b of second leg portion 34b is coupled to housing 32 by second hinge pin 40b along a second axis of rotation. In accordance with various embodiments, first leg portion 34a and second leg portion 34b are coupled together in such a manner that they may be deployed from a closed position to the open position in a substantially synchronous manner such that when a user grasps and extends either of first leg portion 34a and second leg portion 34b, first leg portion 34a and second leg portion 34b are extended at substantially the same time. In the illustrated embodiments, a first gear 42a associated with first leg portion 34a and disposed on first hinge pin 40a is coupled to a second gear 42b associated with second leg portion 34b and disposed on second hinge pin 40b.

In the illustrated embodiment, housing 32 includes a first recess 44a from which first leg portion 34a is configured to deploy, and a second recess 44b from which second leg portion 34b is configured to deploy. In the illustrated embodiment, the first axis of rotation and the second axis of rotation are configured such that first leg portion 34a and second leg portion 34b swing outwardly and downwardly during deployment from first recess 44a and second recess portion 44b, respectively, such that electronic device 30 is supported in a backward titled position when first foot portion 66a of first leg portion 34a and second foot portion 36b of second leg portion 34b are placed upon a surface in the deployed open position. In the deployed open position of the retractable leg support, a bottom portion of housing 32, first foot portion 36a, and second foot portion 36b are in contact with the surface in order to support electronic device 30 in the desktop configuration.

In a particular embodiment, first leg portion 34a and/or second leg portion 34b may be coupled to a release spring (not shown) and electronic device 30 may further include a release latch mechanism 46 configured to allow to a user to release first leg portion 34a and second leg portion 34b from first recess 44a and second recess 44b from a spring release. In accordance with various embodiments, release latch mechanism 46 may include a mechanical latch, a touch sensitive/electromechanical latch, or any other suitable latch mechanism.

Figure 4B:
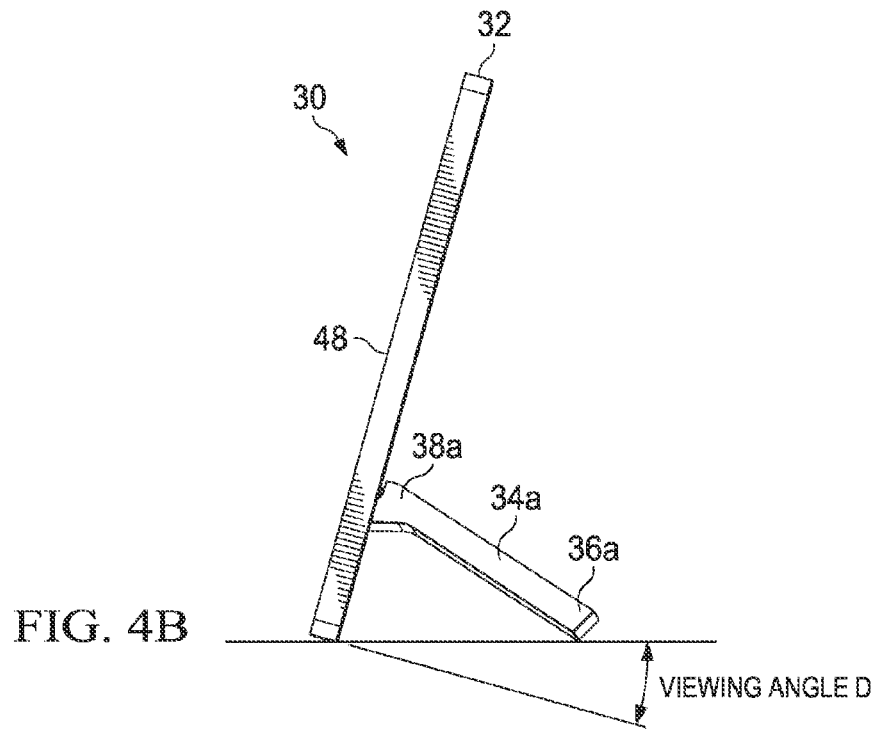
FIG. 4B is a simplified side perspective view illustrating an embodiment of the electronic device having a retractable leg support in an open position in accordance with one embodiment of the present disclosure.

FIG. 4B is a simplified side perspective view illustrating an embodiment of the electronic device 30 having a retractable leg support in an open position in accordance with one embodiment of the present disclosure. FIG. 4B illustrates the retractable leg support in a deployed open position and electronic device 30 placed and supported on a surface to provide a stable footprint to allow a user to operate electronic device 30 in the desktop configuration in order to view and/or interact with display screen 48 of electronic device 30. In one or more embodiments, display screen 48 can be a liquid crystal display (LCD), organic light-emitting diode (OLED), or some other type of display. In some embodiments, display screen 48 may also be a touchscreen display. In the embodiment illustrated in FIG. 4B, first leg portion 34a and second leg port 34b are configured to support electronic device 30 at a predetermined viewing angle D when first foot portion 36a, second foot portion 36b, and a bottom edge of housing 32 are in contact with the surface. In a particular embodiment, the viewing angle D is approximately fifteen (15) degrees. In still other embodiments, first leg portion 34a and second leg portion 34b may be configured to provide any desired viewing angle D.

Figure 4C:
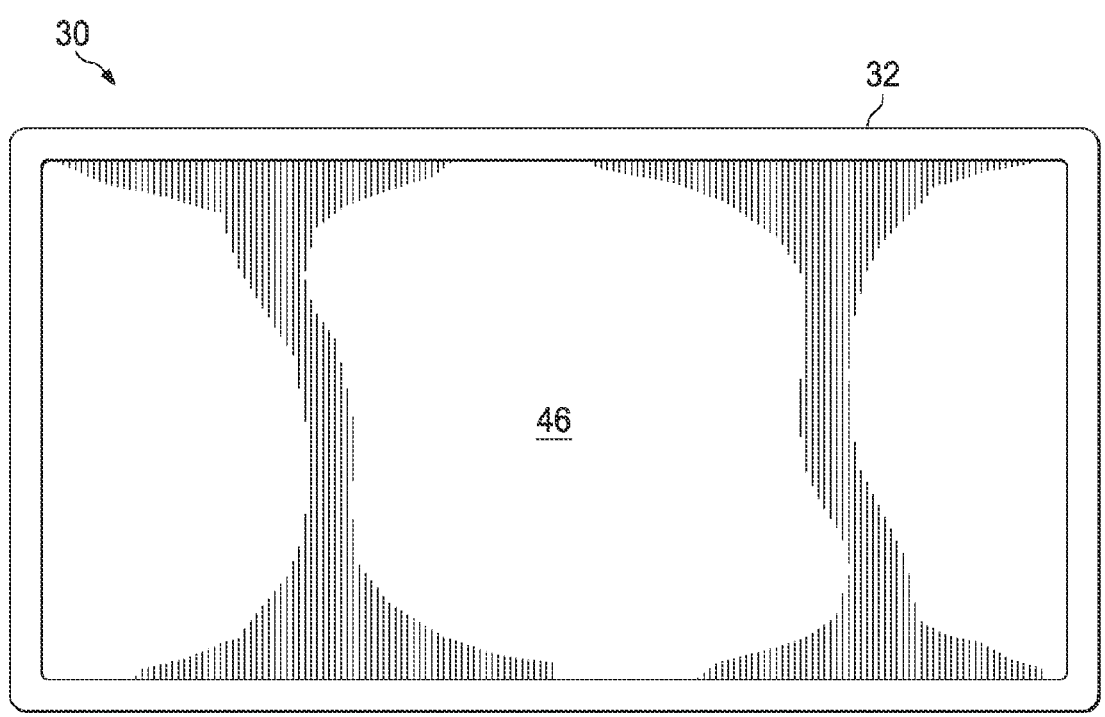
FIG. 4C is a simplified front view illustrating an embodiment of the electronic device in accordance with one embodiment of the present disclosure.

FIG. 4C is a simplified front view illustrating an embodiment of the electronic device 30 in accordance with one embodiment of the present disclosure. FIG. 4C shows the display screen 46 disposed within a front portion of housing 32 which enables a user to view content displayed by display screen 46 and/or interact with display screen 46 when first leg portion 34a and second leg portion 34b are in either the closed position or the open position.

Figure 4D:
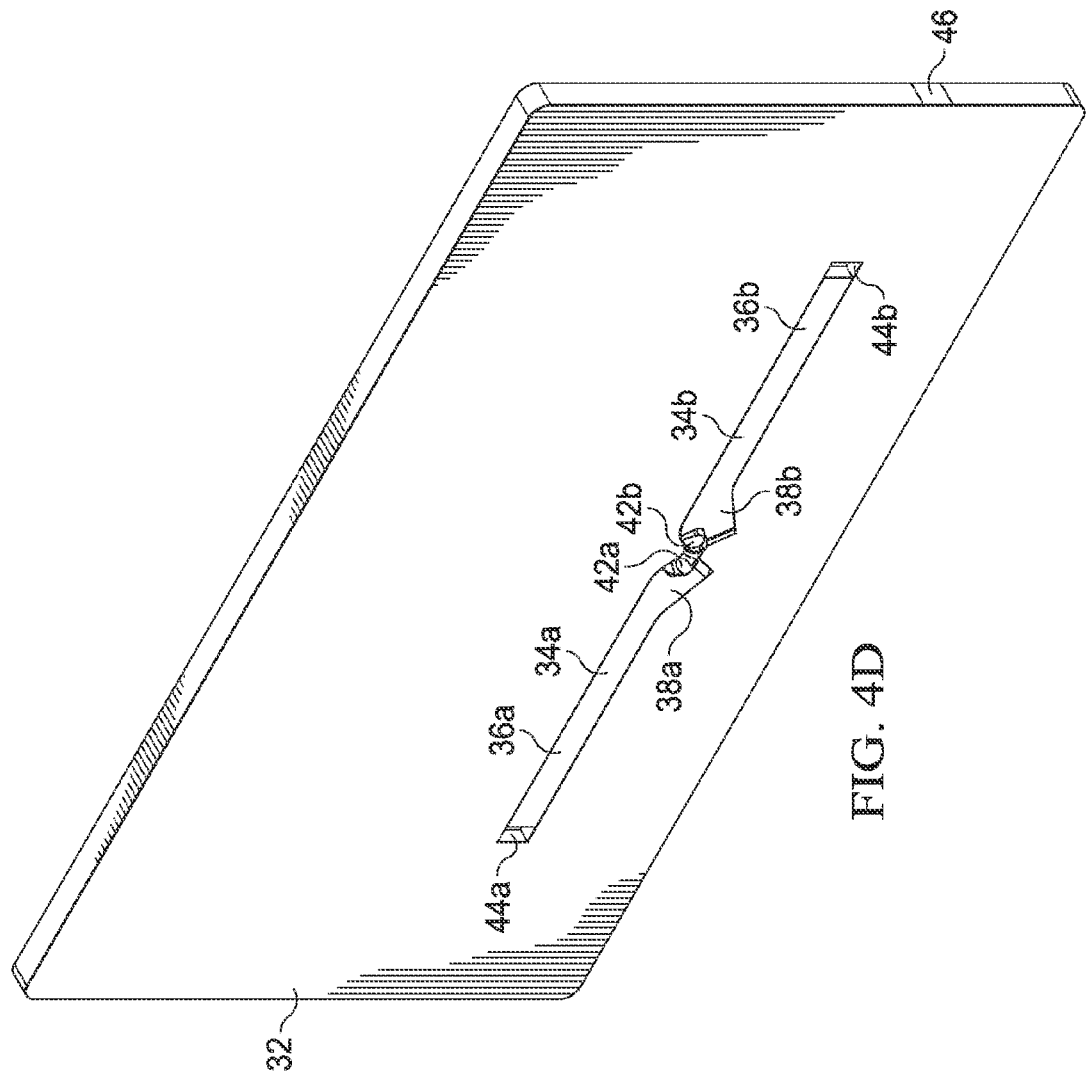
FIG. 4D is a simplified rear perspective view illustrating an embodiment of the electronic device having a retractable leg support in a closed configuration in accordance with one embodiment of the present disclosure.

FIG. 4D is a simplified rear perspective view illustrating an embodiment of the electronic device 30 having a retractable leg support in a closed configuration in accordance with one embodiment of the present disclosure. In the embodiment illustrated in FIG. 4D, first leg portion 34a is retracted within first recess 44a and second leg portion 34b is retracted within second recess 44b. In the particular embodiment illustrated in FIG. 4D, when electronic device 30 is in the closed configuration, first leg portion 34a and second leg portion 34b are disposed laterally along a lower quarter of the rear portion of housing 32 within first recess 44a and second recess 44b, respectively. In the closed configuration, electronic device 30 may be used in a handheld mode in which a user may grasp the electronic device 30 while in use.

In accordance with various embodiments, the retractable leg support mechanism illustrated in FIGS. 4A-4D may be constructed in a similar manner as that described with respect to FIG. 2 and/or FIG. 3. First leg portion 32a is coupled to first hinge pin 40a via first hinge portion 38a. First gear 42a is fixedly attached to first hinge portion 38a of first leg portion 34a and configured to rotate about the first axis of first hinge pin 40a. Similarly, second leg portion 34b is coupled to second hinge pin 40b via second hinge portion 38b, and second gear 42b is fixedly attached to second hinge portion 38b of second leg portion 34b. Second gear 42b is further configured to rotate about the second axis of second hinge pin 40b.

First gear 42a is further coupled to second gear 42b such that rotation of first gear 42a about first hinge pin 40a causes a corresponding rotation of second gear 42b about second hinge pin 40b. Similarly, rotation of second gear 42b about second hinge pin 40b causes a corresponding rotation of first gear 42a about first hinge pin 40a. Accordingly, when a user extends first leg portion 34a from a closed position to an open position, swinging out of first leg portion 34a causes rotation of first gear 42a about first hinge pin 40a. The rotation of first gear 42a bout first hinge pin 40a causes a corresponding rotation of second gear 42b about second hinge pin 40b. Rotation of second gear 42b about second hinge pin 40b causes a corresponding extension of second leg portion 34b from the closed to the open position. Accordingly, first leg portion 34a and second leg portion 34b are extended to the open position in a substantially synchronous manner when either of first leg portion 34a and second leg portion 34b are extended by the user. Similarly, folding of either of first leg portion 34a or second leg portion 34b from the open extended position to a closed stowed position causes first leg portion 34a and second leg portion 34b to be stowed within first recess 44a and second recess 44b, respectively, in a substantially synchronous manner.

FIG. 5A is a simplified rear perspective view illustrating an embodiment of an electronic device 50 having a retractable leg support in an open position in accordance with one embodiment of the present disclosure. In the embodiment illustrated in FIG. 5A, the retractable leg support is coupled to electronic device 50 via a tilt hinge allowing tilting of the electronic device 50 in the desktop configuration in addition to providing substantially synchronous deployment of the support legs of the retractable leg support. FIG. 5A illustrates the retractable leg support in a deployed open position to allow electronic device 50 to be placed and supported on a surface to allow a user to operate electronic device 50 in a desktop configuration. Electronic device 50 includes a housing 52 having a first leg portion 54a and a second leg portion 54b. First leg portion 54a includes a first foot portion 56a at a first end thereof and a first hinge portion 58a at a second end thereof. Similarly, second leg portion 54b includes a second foot portion 56b at a first end thereof and a second hinge portion 58b at a second end thereof. First hinge portion 58a and second hinge portion 58b are each hingedly coupled to a third hinge portion 66 and are configured to be stowed along a bottom rear portion of housing 12 when the retractable leg support is in the closed configuration. Third hinge portion 66 is further hingedly coupled to a rear portion of housing 52 via a third hinge pin 68 to allow first leg portion 54a and second leg portion 54b to be further tilted upwardly to provide further tilt to electronic device 50 in the desktop configuration. In one or more embodiments, the tilt angle of third hinge portion 66 is adjustable by the user in order to provide a desired viewing angle.

FIG. 5A Illustrates the canting of the individual hinge axes that allow first leg portion 54a and second leg portion 54b to rotate upwards as well as horizontally, so that electronic device 50 may be positioned at a suitable angle from the vertical for desktop interaction. First hinge portion 58a of first leg portion 54a is coupled to third hinge portion 66 by a first hinge pin 60a along a first axis of rotation, and second hinge portion 58b of second leg portion 54b is coupled to third hinge portion 66 by second hinge pin 50b along a second axis of rotation. In accordance with various embodiments, first leg portion 54a and second leg portion 54b are coupled together in such a manner that they may be deployed from a closed position to the open position in a substantially synchronous manner such that when a user grasps and extends either of first leg portion 54a and second leg portion 54b, first leg portion 54a and second leg portion 54b are extended at substantially the same time. In the illustrated embodiments, a first gear 62a associated with first leg portion 54a and disposed on first hinge pin 60a is coupled to a second gear 52b associated with second leg portion 54b and disposed on second hinge pin 60b.

In the illustrated embodiment, housing 52 includes a first recess 64a from which first leg portion 54a is configured to deploy, a second recess 64b from which second leg portion 14b is configured to deploy, and third recess 70 from which third hinge portion 66 is configured to deploy. In the illustrated embodiment, first leg portion 54a is configured to deploy from first recess 64a in a first arc, second leg portion 54b is configured to deploy from second recess 64b in a second arc, and hinge portion 66 is configured to deploy from third recess 70 in a third arc. In the deployed open position of the retractable leg support, a bottom portion of housing 52, first foot portion 56a, and second foot portion 56b are in contact with the surface in order to support electronic device 10 in the desktop configuration.

FIG. 5B is a simplified side perspective view illustrating an embodiment of the electronic device 50 having a retractable leg support in an open position in accordance with one embodiment of the present disclosure. FIG. 5B illustrates the retractable leg support in a deployed open position and electronic device 50 placed and supported on a surface to provide a stable footprint to allow a user to operate electronic device 50 in the desktop configuration to display and/or interact with a display screen 72 of electronic device 50. In one or more embodiments, display screen 72 can be a liquid crystal display (LCD), organic light-emitting diode (OLED), or some other type of display. In some embodiments, display screen 28 may also be a touchscreen display. In the embodiment illustrated in FIG. 5B, first leg portion 54a, second leg port 54b, and third hinge portion 55 are configured to support electronic device 50 at a predetermined viewing angle when first foot portion 56a, second foot portion 56b, and a bottom edge of housing 52 are in contact with the surface.

FIG. 5C is a simplified front view illustrating an embodiment of the electronic device 50 in a partially closed configuration in accordance with one embodiment of the present disclosure. FIG. 5C shows the retractable leg support in the process of being placed in the closed position in which third hinge portion 66 has been folded from the open position to the closed position and is disposed within third recess 70. In the embodiment illustrated in FIG. 5C, first leg portion 54a and second leg portion 54b are still in the open configuration.

Figure 5D:
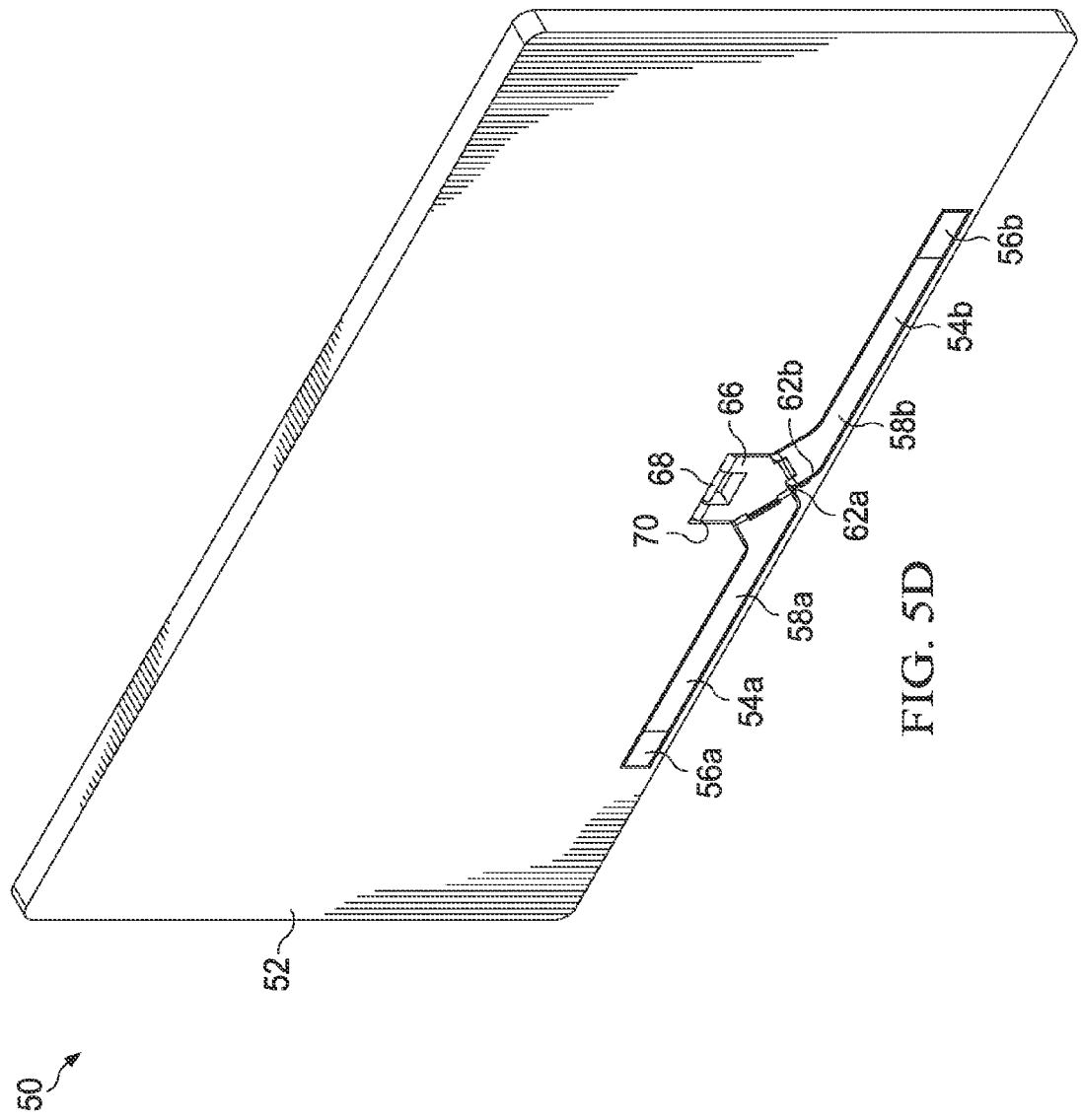
FIG. 5D is a simplified rear perspective view illustrating an embodiment of the electronic device having the retractable leg support in a closed configuration in accordance with one embodiment of the present disclosure.

FIG. 5D is a simplified rear perspective view illustrating an embodiment of the electronic device 50 having the retractable leg support in a closed configuration in accordance with one embodiment of the present disclosure. In the embodiment illustrated in FIG. 5D, first leg portion 54a is retracted within first recess 64a, second leg portion 54b is retracted within second recess 64b, and third hinge portion 66 is retracted within third recess 70. In the particular embodiment illustrated in FIG. 5D, when electronic device 50 is in the closed configuration, first leg portion 54a and second leg portion 54b are disposed laterally along the bottom rear portion of housing 52 within first recess 64a and second recess 64b, respectively. In the closed configuration, electronic device 50 may be used in a handheld mode in which a user may grasp the electronic device 50 while in use.

Figure 6:
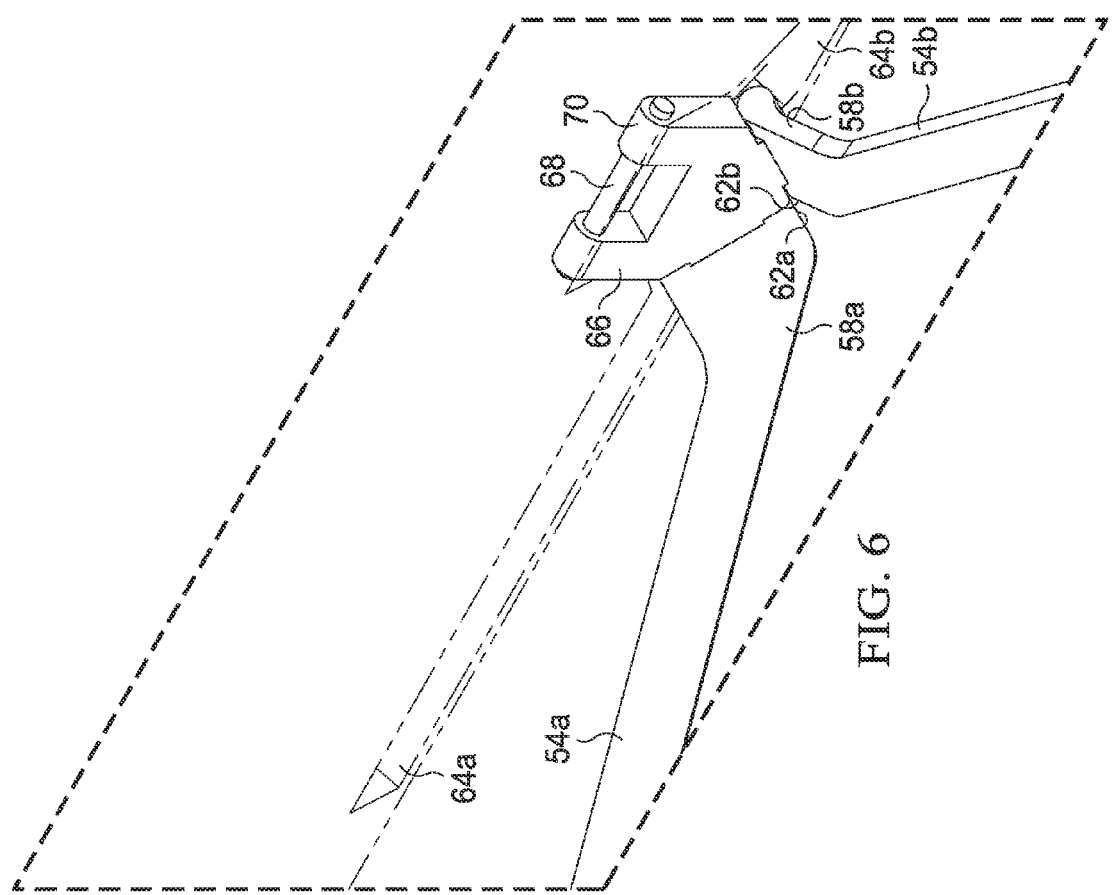
FIG. 6 is a simplified close-up view illustrating an embodiment of a portion of the retractable leg support mechanism of electronic device in accordance with one embodiment of the present disclosure.

FIG. 6 is a simplified close-up view illustrating an embodiment of a portion of the retractable leg support mechanism of electronic device 50 in accordance with one embodiment of the present disclosure. First gear 62a is fixedly attached to first hinge portion 58a of first leg portion 54a and configured to rotate about first hinge pin 60a. Similarly, second leg portion 54b is coupled to second hinge pin 60b via second hinge portion 58b, and second gear 62b is fixedly attached to second hinge portion 58b of second leg portion 54b. Second gear 22b is further configured to rotate about second hinge pin 60b.

First gear 62a is further coupled to second gear 62b such that rotation of first gear 62a about first hinge pin 60a causes a corresponding rotation of second gear 62b about second hinge pin 60b. Similarly, rotation of second gear 62b about second hinge pin 60b causes a corresponding rotation of first gear 62a about first hinge pin 60a. Accordingly, when a user extends first leg portion 54a from a closed position to an open position, swinging out of first leg portion 54a causes rotation of first gear 62a about first hinge pin 60a. The rotation of first gear 62a about first hinge pin 60a causes a corresponding rotation of second gear 62b about second hinge pin 60b. Rotation of second gear 62b about second hinge pin 60b causes a corresponding extension of second leg portion 54b from the closed to the open position. Accordingly, first leg portion 54a and second leg portion 54b are extended to the open position in a substantially synchronous manner when either of first leg portion 54a and second leg portion 54b are extended by the user. Further, third hinge portion 66 may be extended to provide increased tilt to electronic device 50. Similarly, when third hinge portion 66 is folded into the closed position within third recess 70, folding of either of first leg portion 54a or second leg portion 54b from the open extended position to a closed stowed position causes first leg portion 54a and second leg portion 54b to be stowed within first recess 64a and second recess 64b, respectively, in a substantially synchronous manner.

Figure 7:
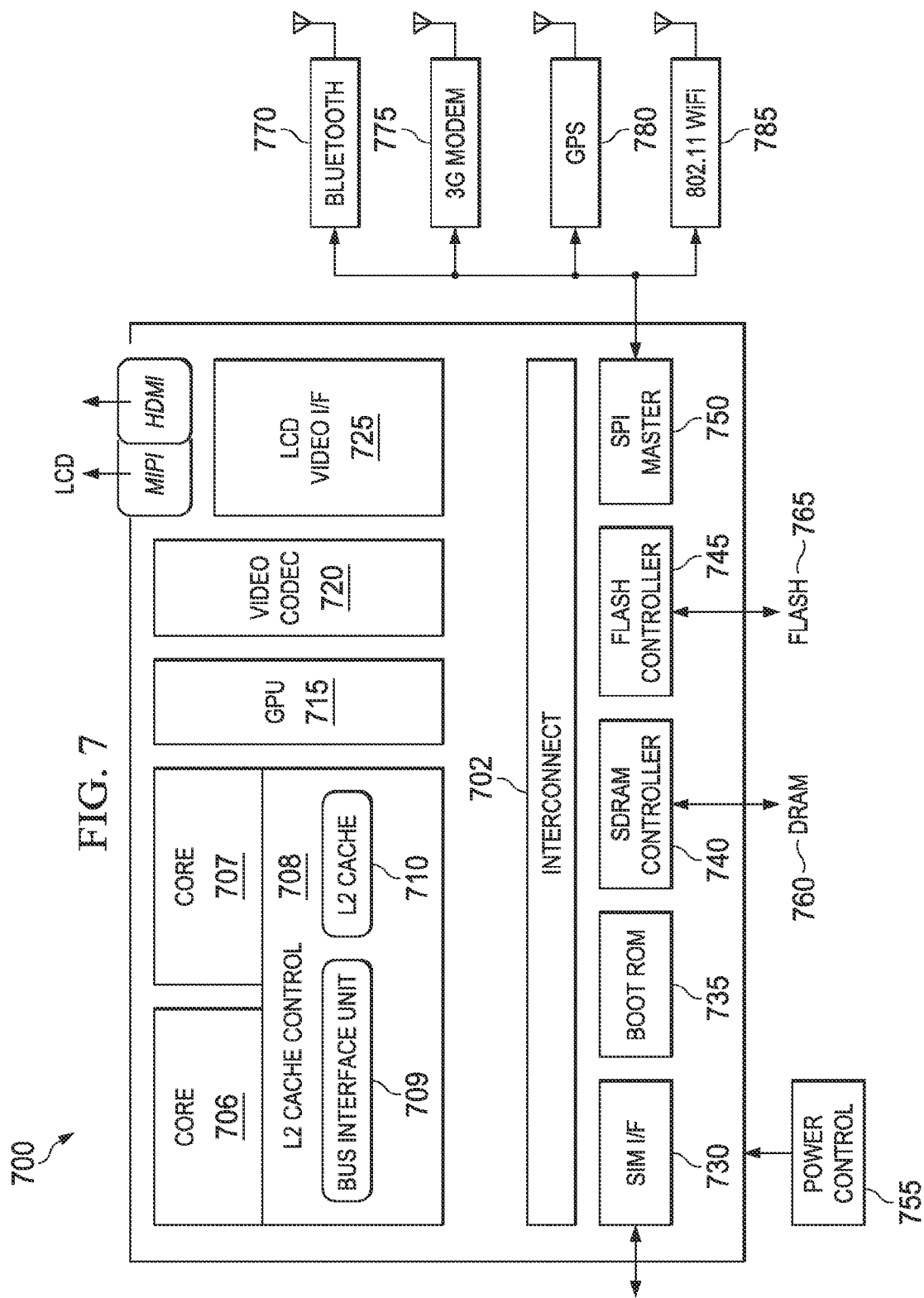
FIG. 7 is a simplified block diagram associated with an example ARM ecosystem system on chip (SOC) of the present disclosure.

FIG. 7 is a simplified block diagram associated with an example ARM ecosystem SOC 700 of the present disclosure. At least one example implementation of the present disclosure can include the retractable leg support discussed herein and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LDC.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiment include one or more communication capabilities, interfaces, and features such as instances of Bluetooth™ M 770, a 3G modem 775, a global positioning system (GPS) 780, and an 802.11 WiFi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
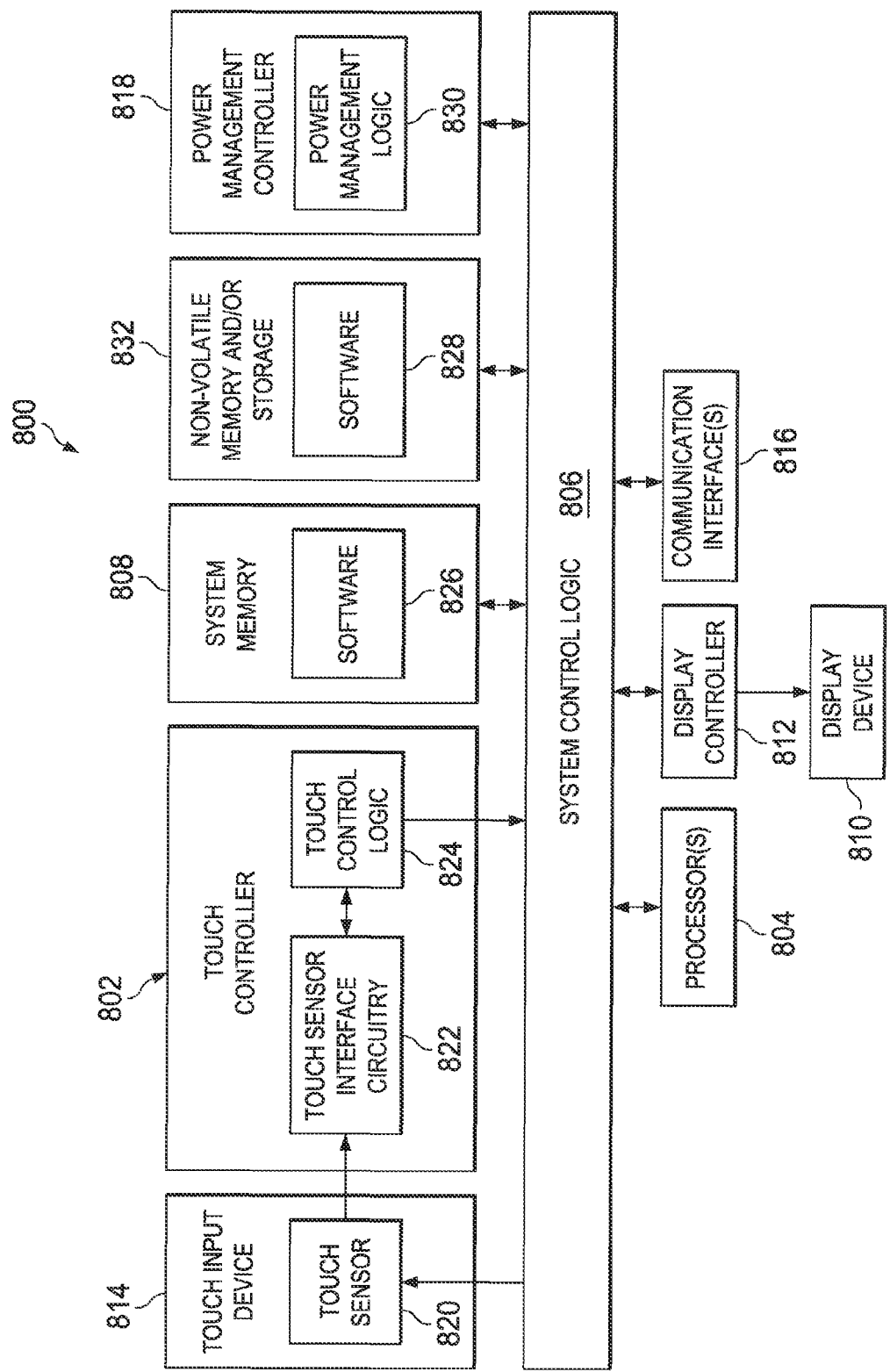
FIG. 8 is a simplified block diagram illustrating example logic that may be used to execute activities associated with the present disclosure.

FIG. 8 is a simplified block diagram illustrating potential electronics and logic that may be associated with electronic device 10, 30, or 50 discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, and/or communication interfaces 816 coupled to system control logic 806.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 800 is part of a more generalized enclosure.

System control logic 806, in at least one embodiment, can include any suitable interface controllers to provide for any suitable interface to at least one processor 804 and/or to any suitable device or component in communication with system control logic 806. System control logic 806, in at least one embodiment, can include one or more memory controllers to provide an interface to system memory 808. System memory 808 may be used to load and store data and/or instructions, for example, for system 800. System memory 808, in at least one embodiment, can include any suitable volatile memory, such as suitable dynamic random access memory (DRAM) for example. System control logic 806, in at least one embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions. In at least one example embodiment, power management controller 818 is configured to reduce the power consumption of components or devices of system 800 that may either be operated at reduced power or turned off when the electronic device is in a closed configuration. For example, in at least one embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem. System control logic 806, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 804 may be packaged together with logic for one or more controllers of system control logic 806. In at least one embodiment, at least one processor 804 may be packaged together with logic for one or more controllers of system control logic 806 to form a System in Package (SiP). In at least one embodiment, at least one processor 804 may be integrated on the same die with logic for one or more controllers of system control logic 806. For at least one embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is an electronic device, comprising: a housing; a first leg portion having a first hinge portion coupled to the housing; a second leg portion having a second hinge portion coupled to the housing; and a gear mechanism configured to couple the first hinge portion to the second hinge portion, wherein rotation of the first hinge portion about a first axis to move the first leg portion in a first arc causes a corresponding rotation of the second hinge portion about a second axis to move the second leg portion in a second arc.

In Example 2, the subject matter of Example 1 can optionally include wherein the gear mechanism comprises: a first gear fixedly coupled to the first hinge portion of the first leg portion; and a second gear fixedly coupled to the second hinge portion of the second leg portion.

In Example 3, the subject matter of Example 2 can optionally include wherein a pitch of the first gear is substantially the same as a pitch of the second gear.

In Example 4, the subject matter of Example 2 can optionally include wherein at least one of the first gear and the second gear is a bevel gear.

In Example 5, the subject matter of Examples 1-4 can optionally include a first hinge pin configured to couple the first hinge portion to the housing; and a second hinge pin configured to couple the second hinge portion to the housing.

In Example 6, the subject matter of Examples 1-5 can optionally include wherein the first leg portion is disposed within a first recess of the housing when the first leg portion is in a closed configuration, and the second leg portion is disposed within a second recess of the housing when the second leg portion is in the closed configuration.

In Example 7, the subject matter of Examples 1-6 can optionally include a third hinge portion hingedly coupled to the first hinge portion of the first leg portion and the second hinge portion of the second leg portion, the third hinge portion further hingedly coupled to the housing.

In Example 8, the subject matter of Example 7 can optionally include wherein the third hinge portion is disposed within a third recess of the housing when the third hinge portion is in a closed configuration.

In Example 9, the subject matter of Examples 1-8 can optionally include wherein the first arc is substantially equal to the second arc.

In Example 10, the subject matter of Examples 1-9 can optionally a release mechanism configured to allow to a user to release the first leg portion and second leg portion from the housing.

In Example 11, the subject matter of Examples 1-10 can optionally include a foot portion at an end of the first leg portion, the foot portion configured to allow a user to extend first leg portion and second leg portion into an open configuration.

Example 12 is an electronic device, comprising: a housing; a retractable leg support coupled to the housing, the retractable leg support including: a first leg portion having a first hinge portion coupled to the housing; a second leg portion having a second hinge portion coupled to the housing; and a gear mechanism configured to couple the first hinge portion to the second hinge portion, wherein rotation of the first hinge portion about a first axis to move the first leg portion in a first arc causes a corresponding rotation of the second hinge portion about a second axis to move the second leg portion in a second arc.

In Example 13, the subject matter of Example 12 can optionally include wherein the gear mechanism comprises: a first gear fixedly coupled to the first hinge portion of the first leg portion; and a second gear fixedly coupled to the second hinge portion of the second leg portion.

In Example 14, the subject matter of Examples 12-13 can optionally include a first hinge pin configured to couple the first hinge portion to the housing; and a second hinge pin configured to couple the second hinge portion to the housing.

In Example 15, the subject matter of Examples 12-14 can optionally include wherein the first leg portion is disposed within a first recess of the housing when the first leg portion is in a closed configuration, and the second leg portion is disposed within a second recess of the housing when the second leg portion is in the closed configuration.

In Example 16, the subject matter of Examples 12-15 can optionally include a third hinge portion hingedly coupled to the first hinge portion of the first leg portion and the second hinge portion of the second leg portion, the third hinge portion further hingedly coupled to the housing.

In Example 17, the subject matter of Example 16 can optionally include wherein the third hinge portion is disposed within a third recess of the housing when the third hinge portion is in a closed configuration.

Example 18 is a method, comprising: receiving an electronic device having a housing, a first leg portion having a first hinge portion coupled to the housing, a second leg portion having a second hinge portion coupled to the housing, and a gear mechanism configured to couple the first hinge portion to the second hinge portion; and rotating the first hinge portion about a first axis to move the first leg portion in a first arc thereby causing a corresponding rotation of the second hinge portion about a second axis to move the second leg portion in a second arc.

In Example 19, the subject matter of Example 18 can optionally include wherein the gear mechanism includes a first gear fixedly coupled to the first hinge portion of the first leg portion, and a second gear fixedly coupled to the second hinge portion of the second leg portion.

In Example 20, the subject matter of Examples 18-19 can optionally include wherein the electronic device further includes a first hinge pin configured to couple the first hinge portion to the housing, and a second hinge pin configured to couple the second hinge portion to the housing.

In Example 21, the subject matter of Examples 18-20 can optionally include wherein the first leg portion is disposed within a first recess of the housing when the first leg portion is in a closed configuration, and the second leg portion is disposed within a second recess of the housing when the second leg portion is in the closed configuration.

In Example 22, the subject matter of Examples 18-21 can optionally include wherein the electronic device further includes a third hinge portion hingedly coupled to the first hinge portion of the first leg portion and the second hinge portion of the second leg portion, the third hinge portion further hingedly coupled to the housing.

Example 23 is an apparatus comprising means for performing the method of any one of Examples 18-22.

Example 24 is a system, comprising: means for receiving an electronic device having a housing, a first leg portion having a first hinge portion coupled to the housing, a second leg portion having a second hinge portion coupled to the housing, and a gear mechanism configured to couple the first hinge portion to the second hinge portion; and means for rotating the first hinge portion about a first axis to move the first leg portion in a first arc thereby causing a corresponding rotation of the second hinge portion about a second axis to move the second leg portion in a second arc.

In Example 25, the subject matter of Example 24 can optionally include wherein the gear mechanism includes a first gear fixedly coupled to the first hinge portion of the first leg portion, and a second gear fixedly coupled to the second hinge portion of the second leg portion.

In Example 26, the subject matter of Examples 24-25 can optionally include wherein the electronic device further includes a first hinge pin configured to couple the first hinge portion to the housing, and a second hinge pin configured to couple the second hinge portion to the housing.

In Example 27, the subject matter of Examples 24-26 can optionally include wherein the first leg portion is disposed within a first recess of the housing when the first leg portion is in a closed configuration, and the second leg portion is disposed within a second recess of the housing when the second leg portion is in the closed configuration.

In Example 28, the subject matter of Examples 24-27 can optionally include wherein the electronic device further includes a third hinge portion hingedly coupled to the first hinge portion of the first leg portion and the second hinge portion of the second leg portion, the third hinge portion further hingedly coupled to the housing.

What is claimed is:

1. An electronic device, comprising:
   a housing;
   a first leg portion having a first hinge portion coupled to the housing;
   a second leg portion having a second hinge portion coupled to the housing; and
   a gear mechanism configured to couple the first hinge portion to the second hinge portion, wherein rotation of the first hinge portion about a first axis to move the first leg portion in a first arc causes a corresponding rotation of the second hinge portion about a second axis to move the second leg portion in a second arc, wherein the first axis intersects the second axis, and wherein an angle of intersection of the first axis and the second axis is neither perpendicular nor parallel to the first axis and the second axis.

2. The electronic device of claim 1, wherein the gear mechanism comprises:
   a first gear fixedly coupled to the first hinge portion of the first leg portion; and
   a second gear fixedly coupled to the second hinge portion of the second leg portion.

3. The electronic device of claim 2, wherein a pitch of the first gear is substantially the same as a pitch of the second gear.

4. The electronic device of claim 2, wherein at least one of the first gear and the second gear is a bevel gear.

5. The electronic device of claim 1, further comprising:
   a first hinge pin configured to couple the first hinge portion to the housing; and
   a second hinge pin configured to couple the second hinge portion to the housing.

6. The electronic device of claim 1, wherein the first leg portion is disposed within a first recess of the housing when the first leg portion is in a closed configuration, and the second leg portion is disposed within a second recess of the housing when the second leg portion is in the closed configuration.

7. The electronic device of claim 1, further comprising:
   a third hinge portion hingedly coupled to the first hinge portion of the first leg portion and the second hinge portion of the second leg portion, the third hinge portion further hingedly coupled to the housing.

8. The electronic device of claim 7, wherein the third hinge portion is disposed within a third recess of the housing when the third hinge portion is in a closed configuration.

9. The electronic device of claim 1, wherein the first arc is substantially equal to the second arc.

10. The electronic device of claim 1, further comprising a release mechanism configured to allow a user to release the first leg portion and second leg portion from the housing.

11. The electronic device of claim 1, further comprising a foot portion at an end of the first leg portion, the foot portion configured to allow a user to extend first leg portion and second leg portion into an open configuration.

12. An electronic device, comprising:
    a housing;
    a retractable leg support coupled to the housing, the retractable leg support including:
      a first leg portion having a first hinge portion coupled to the housing;
      a second leg portion having a second hinge portion coupled to the housing; and
      a gear mechanism configured to couple the first hinge portion to the second hinge portion, wherein rotation of the first hinge portion about a first axis to move the first leg portion in a first arc causes a corresponding rotation of the second hinge portion about a second axis to move the second leg portion in a second arc, wherein the first axis intersects the second axis, and wherein an angle of intersection of the first axis and the second axis is neither perpendicular nor parallel to the first axis and the second axis.

13. The electronic device of claim 12, wherein the gear mechanism comprises:
    a first gear fixedly coupled to the first hinge portion of the first leg portion; and
    a second gear fixedly coupled to the second hinge portion of the second leg portion.

14. The electronic device of claim 12, further comprising:
    a first hinge pin configured to couple the first hinge portion to the housing; and a second hinge pin configured to couple the second hinge portion to the housing.

15. The electronic device of claim 12, wherein the first leg portion is disposed within a first recess of the housing when the first leg portion is in a closed configuration, and the second leg portion is disposed within a second recess of the housing when the second leg portion is in the closed configuration.

16. The electronic device of claim 12, further comprising:
a third hinge portion hingedly coupled to the first hinge portion of the first leg portion and the second hinge portion of the second leg portion, the third hinge portion further hingedly coupled to the housing.

17. The electronic device of claim 16, wherein the third hinge portion is disposed within a third recess of the housing when the third hinge portion is in a closed configuration.

18. A method, comprising:
receiving an electronic device having a housing, a first leg portion having a first hinge portion coupled to the housing, a second leg portion having a second hinge portion coupled to the housing, and a gear mechanism configured to couple the first hinge portion to the second hinge portion; and
rotating the first hinge portion about a first axis to move the first leg portion in a first arc thereby causing a corresponding rotation of the second hinge portion about a second axis to move the second leg portion in a second arc, wherein the first axis intersects the second axis, and wherein an angle of intersection of the first axis and the second axis is neither perpendicular nor parallel to the first axis and the second axis.

19. The method of claim 18, wherein the gear mechanism includes a first gear fixedly coupled to the first hinge portion of the first leg portion, and a second gear fixedly coupled to the second hinge portion of the second leg portion.

20. The method of claim 18, wherein the electronic device further includes a first hinge pin configured to couple the first hinge portion to the housing, and a second hinge pin configured to couple the second hinge portion to the housing.

21. The method of claim 18, wherein the first leg portion is disposed within a first recess of the housing when the first leg portion is in a closed configuration, and the second leg portion is disposed within a second recess of the housing when the second leg portion is in the closed configuration.

22. The method of claim 18, wherein the electronic device further includes a third hinge portion hingedly coupled to the first hinge portion of the first leg portion and the second hinge portion of the second leg portion, the third hinge portion further hingedly coupled to the housing.

23. A system, comprising:
means for receiving an electronic device having a housing, a first leg portion having a first hinge portion coupled to the housing, a second leg portion having a second hinge portion coupled to the housing, and a gear mechanism configured to couple the first hinge portion to the second hinge portion; and
means for rotating the first hinge portion about a first axis to move the first leg portion in a first arc thereby causing a corresponding rotation of the second hinge portion about a second axis to move the second leg portion in a second arc, wherein the first axis intersects the second axis, and wherein an angle of intersection of the first axis and the second axis is neither perpendicular nor parallel to the first axis and the second axis.

24. The system of claim 23, wherein the gear mechanism includes a first gear fixedly coupled to the first hinge portion of the first leg portion, and a second gear fixedly coupled to the second hinge portion of the second leg portion.

25. The system of claim 23, wherein the electronic device further includes a first hinge pin configured to couple the first hinge portion to the housing, and a second hinge pin configured to couple the second hinge portion to the housing.

26. The system of claim 23, wherein the first leg portion is disposed within a first recess of the housing when the first leg portion is in a closed configuration, and the second leg portion is disposed within a second recess of the housing when the second leg portion is in the closed configuration.

27. The system of claim 23, wherein the electronic device further includes a third hinge portion hingedly coupled to the first hinge portion of the first leg portion and the second hinge portion of the second leg portion, the third hinge portion further hingedly coupled to the housing.

* * * * *